(12) United States Patent
Zhao et al.

(10) Patent No.: US 11,104,527 B1
(45) Date of Patent: Aug. 31, 2021

(54) TOTE FLIPPER

(71) Applicant: Amazon Technologies, Inc., Seattle, WA (US)

(72) Inventors: Longyu Zhao, Seattle, WA (US); Bob Samac, Cle Elum, WA (US); Xujie Wang, Edgewood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 205 days.

(21) Appl. No.: 16/266,519

(22) Filed: Feb. 4, 2019

(51) Int. Cl.
*B65G 65/23* (2006.01)
*B65G 47/90* (2006.01)

(52) U.S. Cl.
CPC ........... *B65G 65/23* (2013.01); *B65G 47/904* (2013.01); *B65G 47/905* (2013.01); *B65G 2201/025* (2013.01); *B65G 2207/14* (2013.01); *B65G 2811/0663* (2013.01); *B65G 2814/0311* (2013.01)

(58) Field of Classification Search
CPC .................................................. B65G 65/23
See application file for complete search history.

(56) References Cited

U.S. PATENT DOCUMENTS

| | | | | |
|---|---|---|---|---|
| 2,260,697 A * | 10/1941 | Allen | ..................... | B65G 67/00 414/421 |
| 2,321,300 A * | 6/1943 | Keagy | ..................... | B65G 65/23 414/421 |
| 3,978,999 A * | 9/1976 | Ryder | ..................... | B65G 65/23 414/421 |
| 4,072,240 A * | 2/1978 | Ferguson | ................ | B65G 65/23 414/414 |
| 5,895,196 A * | 4/1999 | Forsyth | .................. | B65G 65/23 414/421 |
| 6,012,891 A * | 1/2000 | Timmins | ................ | B65G 65/23 414/414 |
| 6,422,802 B1 * | 7/2002 | Herrin | ..................... | B65B 19/12 414/419 |
| 8,684,653 B2 * | 4/2014 | Applewhite | ........... | B65G 65/34 414/404 |
| 2016/0144586 A1 * | 5/2016 | Schwelling | ........... | B65F 1/1452 100/215 |
| 2017/0297836 A1 * | 10/2017 | Burns | ................... | B65F 1/1473 |
| 2018/0184555 A1 * | 6/2018 | Rossmann | .............. | B65B 25/00 |

* cited by examiner

*Primary Examiner* — Jonathan Snelting
(74) *Attorney, Agent, or Firm* — Patterson + Sheridan, LLP

(57) ABSTRACT

An apparatus for unloading tote contents is provided. The apparatus includes an arm assembly, a door assembly connected to the arm assembly, and first and second drivers configured to rotate the arm assembly and the door assembly about first and second axes, respectively. The arm assembly is configured to pick up a tote from a first conveyor belt. The door assembly is configured to secure at least one item within the tote and provide a ramp for unloading the at least one item from the tote onto a second conveyor belt.

20 Claims, 15 Drawing Sheets

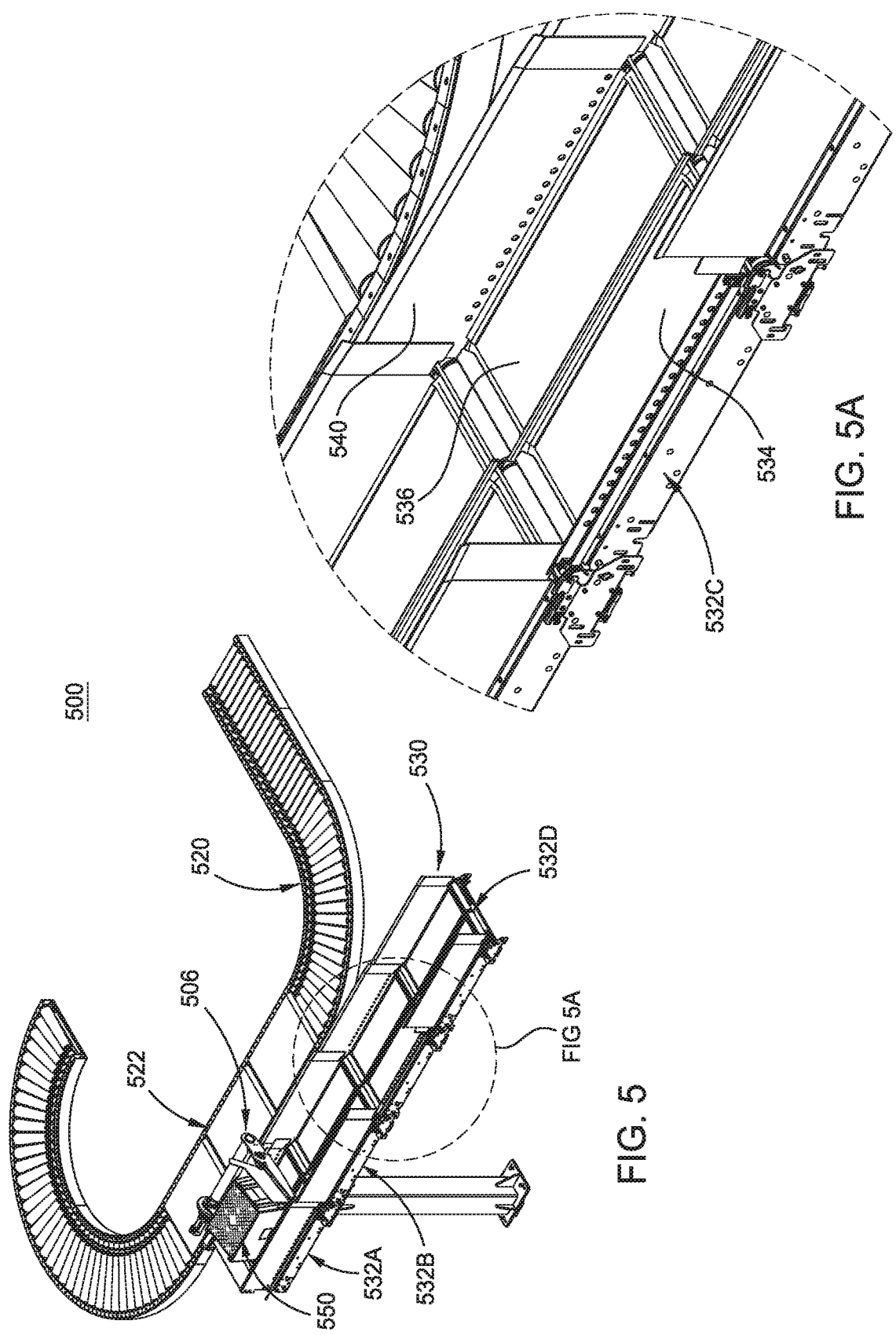

TOTE FLIPPER

BACKGROUND

The present disclosure relates to an automated system for unloading items from a tote (or container).

Many facilities (e.g., warehouses, plants, distribution centers, storehouses, factories, etc.) perform tasks such as storing items, packaging items, shipping items, and the like. Such facilities generally use totes (or containers) to transport items to different locations inside and/or outside the facility. When a tote reaches its destination, the items are unloaded for further processing (e.g., downstream processing, upstream processing, etc.). For example, a tote may be loaded (or filled) with items from a loading dock and transported to a storage location in the facility. In another example, a tote may be retrieved from storage and transported to a location in preparation for shipping.

BRIEF DESCRIPTION OF DRAWINGS

Various embodiments in accordance with the present disclosure will be described with reference to the drawings, where like designations denote like elements.

FIG. 5 illustrates a perspective view of an example system for unloading items from a tote, according to one embodiment.

FIG. 5A further illustrates a portion of the example system illustrated in FIG. 5, according to one embodiment.

DETAILED DESCRIPTION

Figure 1:
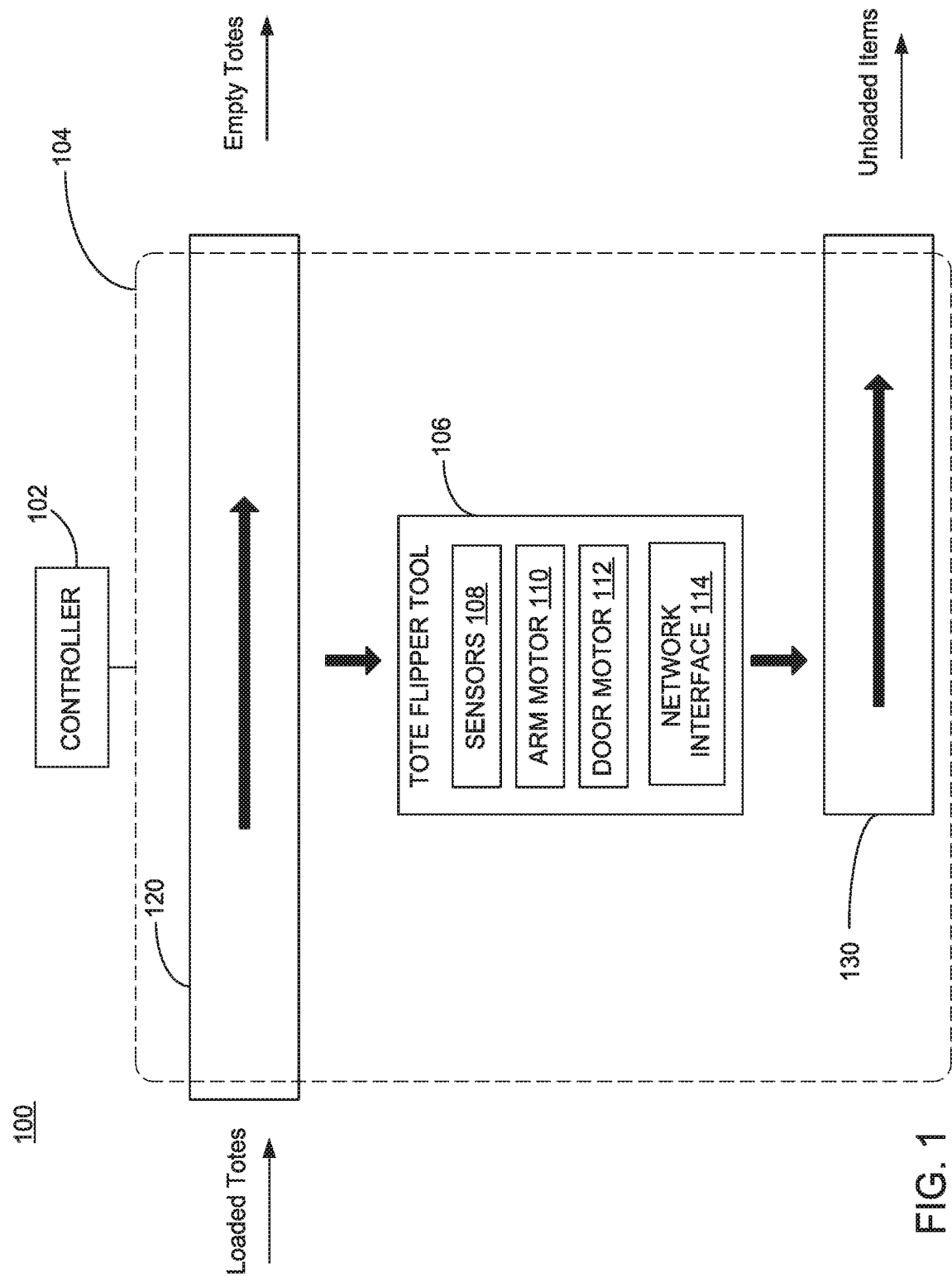
FIG. 1 is a block diagram illustrating an example tote flipper system, according to one embodiment.

Embodiments describe an automated system for unloading items (or contents) from a tote (also referred to as a container, receptacle, bin, and the like). The system includes a tote flipper tool (or machine), which is configured to rotate incoming totes of varying product payloads and smoothly dump the contents onto a receiving surface (e.g., a conveyor belt, table, etc.). The tote flipper tool is equipped with two coordinated rotary axes: an arm axis and a door axis. The arm axis is configured to pick up and flip (or rotate) a tote, while the door axis controls a door assembly on the top of the tote to prevent the items within the tote from falling out when the tote is flipped. The door axis also controls the door assembly to provide a mechanical off-ramp (or chute) for the items as the items are delivered to the receiving surface.

FIG. 1A illustrates an example tote flipper system 100, according to one embodiment. As shown, the tote flipper system 100 includes a (master) controller 102 and an equipment (or machine) area 104. The tote flipper system 100 may be included in any suitable phase(s) of facility operations known to a person of ordinary skill in the art. In one example, the tote flipper system 100 can be included at a station where loaded totes are received and unloaded for sorting and/or packaging. In another example, the tote flipper system 100 can be included at a station where loaded totes are received and unloaded for singulation (e.g., to separate or isolate the item(s) by a specified gap distance). In yet another example, the tote flipper system 100 can be included at a station where loaded totes are received and unloaded for shipping. Other examples of suitable facility operations may include staging at loading zones, transporting to different areas in the facility, loading off vehicles, and so forth.

In this particular embodiment, the equipment area 104 includes a tote flipper tool (or machine) 106 and junction segments 120 and 130. The junction segments 120 and 130 generally represent sections of the facility in which totes (e.g., loaded and/or unloaded totes) and/or individual items are moved (or transitioned) within the equipment area 104. For the sake of clarity, the equipment area 104 represents a portion of the overall equipment or facility operations that may be used within a given facility. That is, the equipment area 104 depicts junction segments that are adjacent to (or in close proximity) to the tote flipper tool 106, relative to other junction segments and/or equipment (not shown) in the facility. The junction segments 120 and 130 can have a variety of different configurations (e.g., shape, material, angle, height (or elevation), etc.) suitable for a given equipment area 104 within a facility. For example, the junction segments 120 and/or 130 can be oriented horizontally, tilted (e.g., with an inclination), etc. In some examples, the junction segment 120 may be at a different height (or elevation) than the junction segment 130, and vice versa. In some examples, the junction segment 120 and/or the junction segment 130 can have a surface shape that is substantially planar, crowned, domed, concave, convex, irregular, or any other shape or combination of shapes. Additionally, the material(s) that forms the top surface of the junction segments 120 and 130 may be formed of one or more of a variety of materials (e.g., metal, plastic, rubber, fabric, carpet, wood, tile, etc.). In one embodiment, the junction segment 120 and/or the junction segment 130 includes a conveyor belt or a series of conveyor belts (that may have different configurations).

As shown in this example, the junction segment 120 transitions loaded totes (e.g., totes filled with one or more items) from another location in the facility to the tote flipper tool 106. In one embodiment, the tote flipper tool 106 is situated above the junction segment 120 and is configured to pick up loaded totes that come into contact with an arm and/or door of the tote flipper tool 106. As described further below, the tote flipper tool 106 is configured to detect an incoming tote(s) (e.g., on junction segment 120) and smoothly unload the contents of the tote onto the junction segment 130. Once a tote is unloaded, the unloaded tote is returned to the junction segment 120 and transitioned away from the tote flipper tool 106 via the junction segment 120. In one embodiment, the tote flipper tool 106 is configured to fully rotate (or flip) totes from junction segment 120 to a location over junction segment 130 in order to unload the contents of the totes onto junction segment 130.

The tote flipper tool 106 includes one or more sensors 108, an arm motor 110, a door motor 112, and a network interface 114. The sensors 108 are generally used for detecting presence of a tote (e.g., on junction segment 120), determining a position of the door (e.g., whether the door is in a closed position or open position), determining a position of the arm, etc. The sensors 108 can include, for example, proximity sensors, photoelectric sensors, infrared (IR) sensors, laser (detection) sensors, etc. The arm motor 110 and the door motor 112 control the rotation of the arm and door, respectively, of the tote flipper tool 106. For example, as described further below with reference to FIG. 2, the tote flipper tool 106 includes an arm assembly and a door assembly attached to the arm assembly. The door assembly is used to secure the contents of the tote (e.g., as the tote is being rotated) and to provide an off-ramp for smoothly (or gently) unloading items from the tote onto the junction segment 130. The arm motor 110 and the door motor 112 can include, for example, an alternating current (AC) motor, direct current (DC) motor, servo motor, etc. In one embodiment, the arm motor 110 and the door motor 112 are rotary (servo) axes, which are linked (or coordinated) in order to provide a synchronous unloading motion of the tote.

The (master) controller 102 provides control signals (or commands) to the arm motor 110 and the door motor 112 in order to control the operation of the tote flipper tool 106. For example, the controller 102 may send stop commands, start commands, adjust the speed of the axis rotation, etc. In one embodiment, the controller 102 can include processors or micro-controllers. The controller 102 can include solely hardware and firmware or can include combinations of hardware and software elements. In one particular embodiment, the controller 102 is a programmable logic controller (PLC).

The tote flipper tool 106 can receive commands from the controller 102 (e.g., using the network interface 114). In addition to receiving information from the controller 102, the tote flipper tool 106 can transmit information to the controller 102 (e.g., using the network interface 114). For example, the arm motor 110 and/or the door motor 112 can send information (e.g., torque feedback) regarding operation of the respective arm/door motor to the controller 102, the sensors 108 can send information regarding presence and/or position of totes and/or components of the tote flipper tool 106 to the controller 102, etc. The controller 102 may use the information received from the sensors 108, arm motor 110, and the door motor 112 to determine which commands (e.g., stop command, start command, rotate commands, etc.) to send to the arm motor 110 and/or the door motor 112. The network interface 114 may communicate using a wired communication protocol (e.g., Ethernet), a wireless communication protocol (e.g., WiFi), etc.

Although not shown, in some embodiments, the tote flipper tool 106 may include a local controller that is configured to control the arm motor 110 and the door motor 112. In such embodiments, the local controller can receive (e.g., via the network interface 114) control signals (or commands) from the (master) controller 102, and issue corresponding commands to the arm motor 110 and the door motor 112 in order to control operation of the arm assembly and door assembly, respectively. Likewise, the local controller can transmit information (e.g., motor feedback, sensor feedback, etc.) to the controller 102 via the network interface 114. In one embodiment, the local controller can be a processor or a micro-controller. The local controller can include solely hardware and firmware or can include combinations of hardware and software elements. In one particular embodiment, the local controller is a PLC.

Figure 2A:
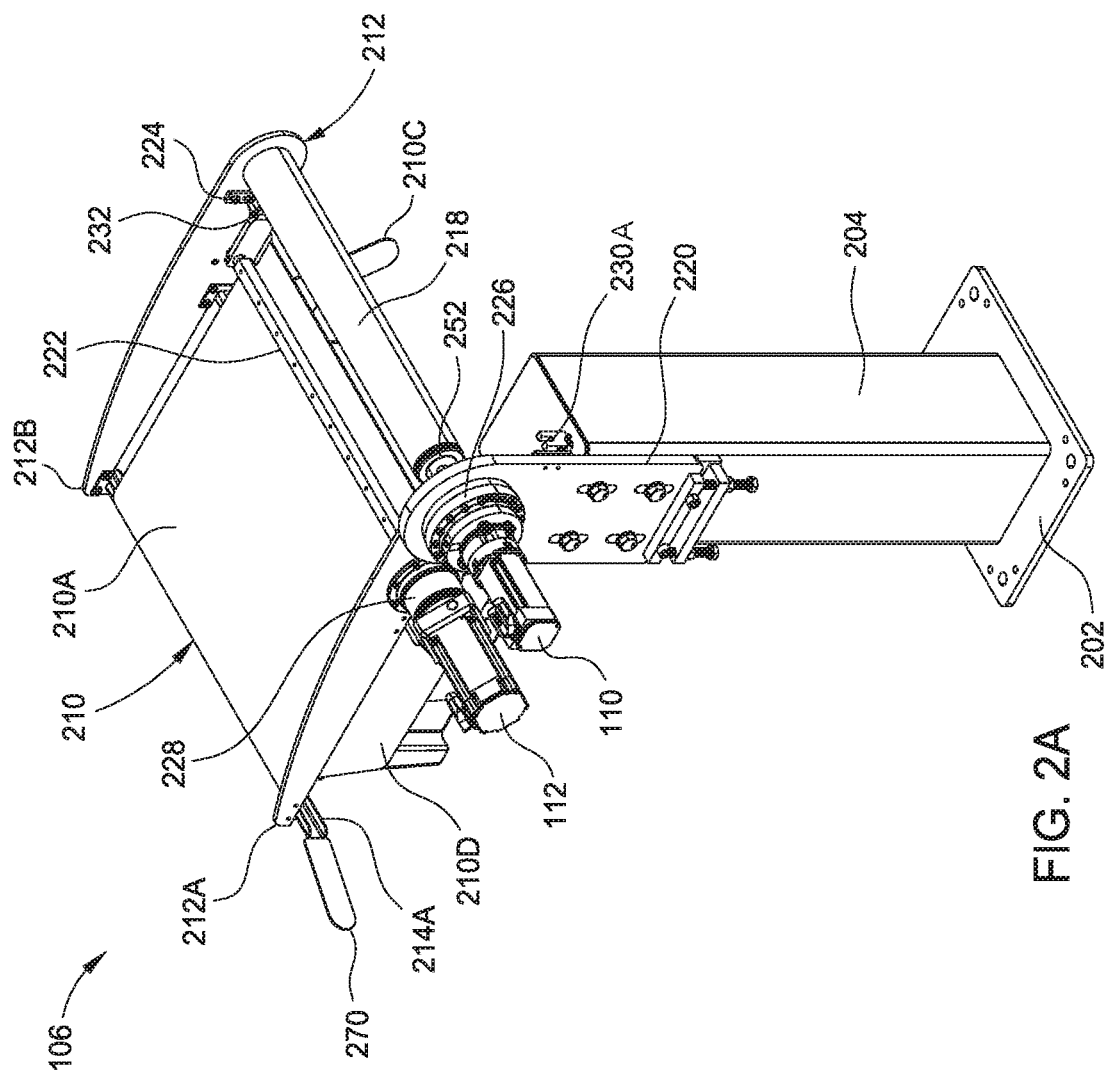
FIG. 2A illustrates a perspective view of an example tote flipper tool, according to one embodiment.
Figure 2B:
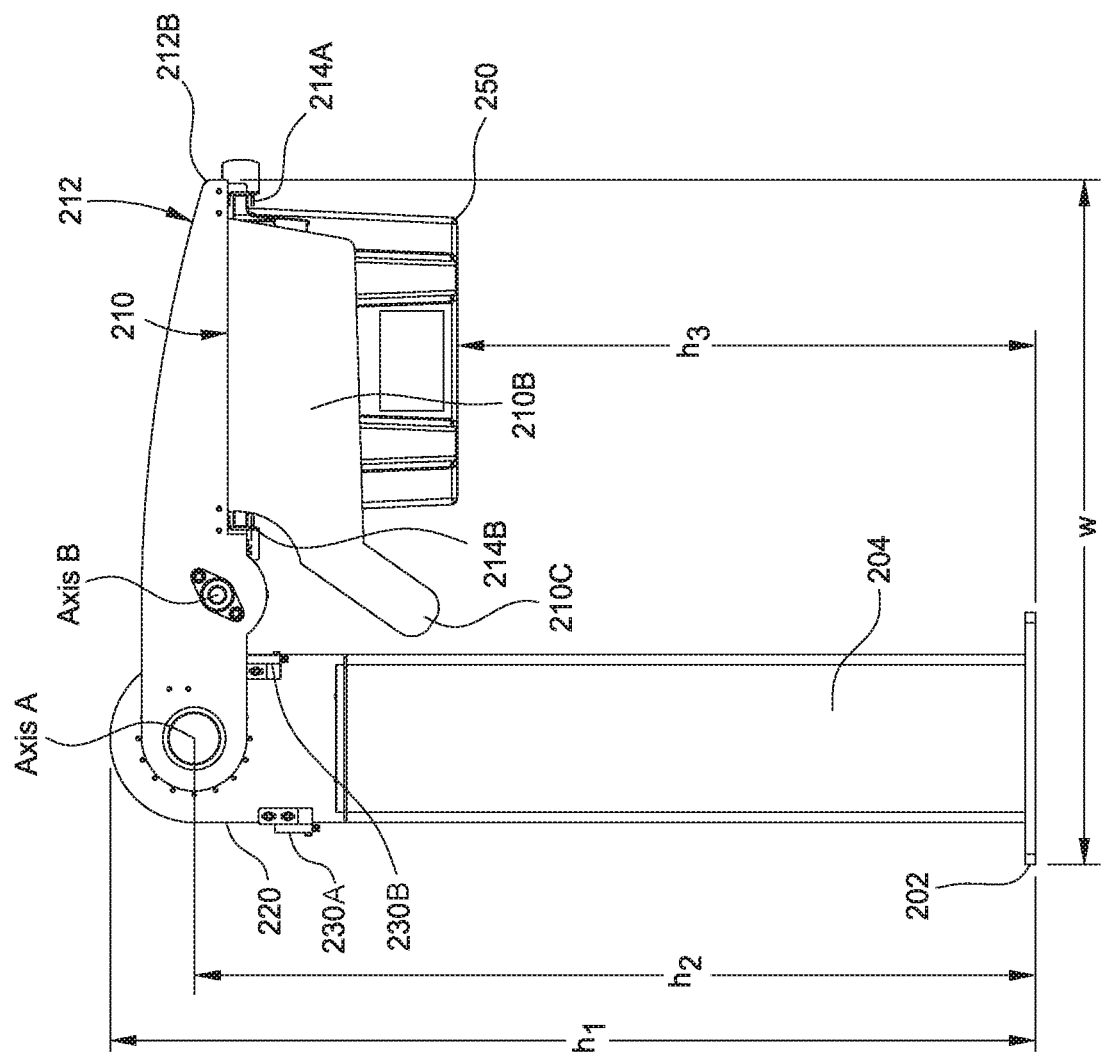
FIG. 2B illustrates a side view of an example tote flipper tool, according to one embodiment.
Figure 2C:
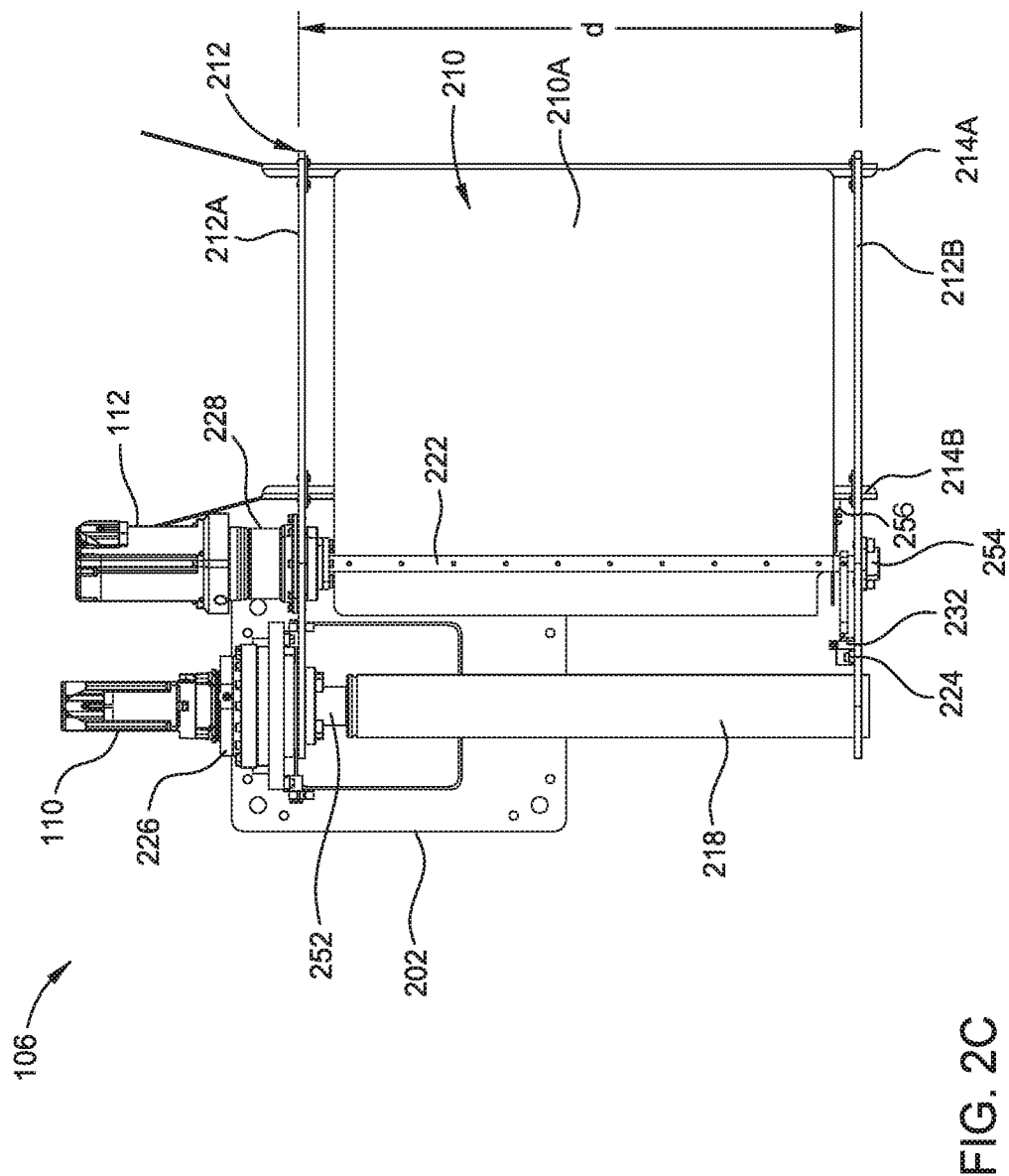
FIG. 2C illustrates a top view of an example tote flipper tool, according to one embodiment.

FIGS. 2A-2C depict different views of an example tote flipper tool 106, according to one embodiment. In particular, FIGS. 2A-2C show a perspective view, a side view, and a top view, respectively, of the tote flipper tool 106. The tote flipper tool 106 includes a base 202, a vertical support member (or mount) 204 attached to the base 202 (e.g., via screws, bolts, brackets, etc.), and a mounting plate (e.g., gearbox mount) 220 attached to a side of the vertical support member 204. A portion of the mounting plate 220 extends vertically above a top surface of the vertical support member 204. In one embodiment, the base 202, the vertical support member 204, and the mounting plate 220 collectively provide a structure for mounting various components (e.g., arm assembly, door assembly, gearbox, motors (or axes), etc.) of the tote flipper tool 106.

The tote flipper tool 106 includes an arm assembly 212 and a door assembly 210. The arm assembly 212 provides a structure for attaching to, picking up, and flipping a tote. In the embodiment shown in FIGS. 2A-2C, the arm assembly 212 includes a first arm member 212A, a second arm member 212B that is parallel to the first arm member 212A, a first shaft 218, and a second shaft 222. The first shaft 218 and the second shaft 222 are perpendicular to the first and second arm members 212A, 212B and are disposed between the first and second arm members 212A, 212B. In particular, the first arm member 212A and the second arm member 212B are connected to opposite ends of the first shaft 218 at proximal ends of the first arm member 212A and the second arm member 212B. Additionally, the first arm member 212A and the second arm member 212B are connected to opposite ends of the second shaft 222 at a distal location along the first arm member 212A and the second arm member 212B. In some embodiments, the distance (d) between the first arm member 212A and the second arm member 212B (e.g., along the first shaft 218) may be based in part on the length of a tote (e.g., tote 250).

The door assembly 210 is disposed between the first arm member 212A and the second arm member 212B and is attached to the arm assembly 212 at the second shaft 222. As shown, the door assembly 210 includes (i) a surface (e.g., top/bottom) portion 210A mounted to the second shaft 222 at a short distance from a first end of the surface portion 210A, (ii) a first side portion 210D at a first side of the surface portion 210A adjacent to the first arm member 212A, and (iii) a second side portion 210B at a second side of the surface portion 210A adjacent to the second arm member 212B.

The tote flipper tool 106 includes two coordinated rotary axes (or drivers), which are used to unload items from a tote. In particular, the tote flipper tool 106 includes the arm motor 110 (e.g., arm rotary axis) for driving the arm assembly 212 and the door motor 112 (e.g., door rotary axis) for driving the door assembly 210. The arm motor 110 is coupled to a gearbox assembly 226 on a first side of the mounting plate 220, and the gearbox assembly 226 is coupled to the first shaft 218 at the proximal end of the first arm member 212A (e.g., on a second opposite side of the mounting plate 220. As shown in FIG. 2B, the arm motor 110 is configured to rotate the arm assembly 212 (e.g., first arm member 212A and second arm member 212B) about the first axis A (e.g., horizontal direction out of the page/into the page in FIG. 2B) extending along a length of the first shaft 218. In some embodiments, an adapter assembly 252 can be used to interface the gearbox assembly 226 with the first shaft 218 (e.g., as shown in FIGS. 2A and 2C).

The door motor 112 is coupled to a gearbox assembly 228 on a first (outer) side of the first arm member 212A, and the gearbox assembly 228 is coupled to the second shaft 222 at the distal location along the first arm member 212A. As shown in FIG. 2B, the door motor 112 is configured to rotate the door assembly 210 (e.g., surface portion 210A, side portions 210B, 210D, etc.) about the second axis B (e.g., horizontal direction out of the page/into the page in FIG. 2B) extending along a length of the second shaft 222. As shown in FIG. 2C, in some embodiments, the second shaft 222 can be connected to a bearing assembly (e.g., sleeve bearing) 254 on an outside of the second arm member 212B, e.g., to reduce friction associated with the rotation of the door assembly 210. In one embodiment, the door assembly 210 can be rotated independently from the arm assembly 212, and vice versa. In one embodiment, the door assembly 210 can be rotated synchronously with the arm assembly 212, and vice versa.

The arm motor 110 is adjacent to the door motor 112, and the rotation axes (e.g., first axis A and second axis B) of the arm motor 110 and the door motor 112 are substantially parallel. In one embodiment, the door motor 112 may be offset vertically relative to the arm motor 110. In one embodiment, the arm motor 110 and the door motor 112 are servo motors.

In one embodiment, the door assembly 210 is used to secure the contents of the tote as the tote is rotated, e.g., by forming an enclosure over a top opening of the tote. For example, when the door assembly 210 is rotated to a given position(s) (e.g., a predetermined angle, such as 0 degrees) about the second axis B, the door assembly 210 may form an enclosure/cover over the top opening of the tote to prevent items from falling out of the tote. In particular, the surface portion 210A may form a top surface, and the side portions 210B, 210D may form downwardly extending portions from the top surface.

Figure 3:
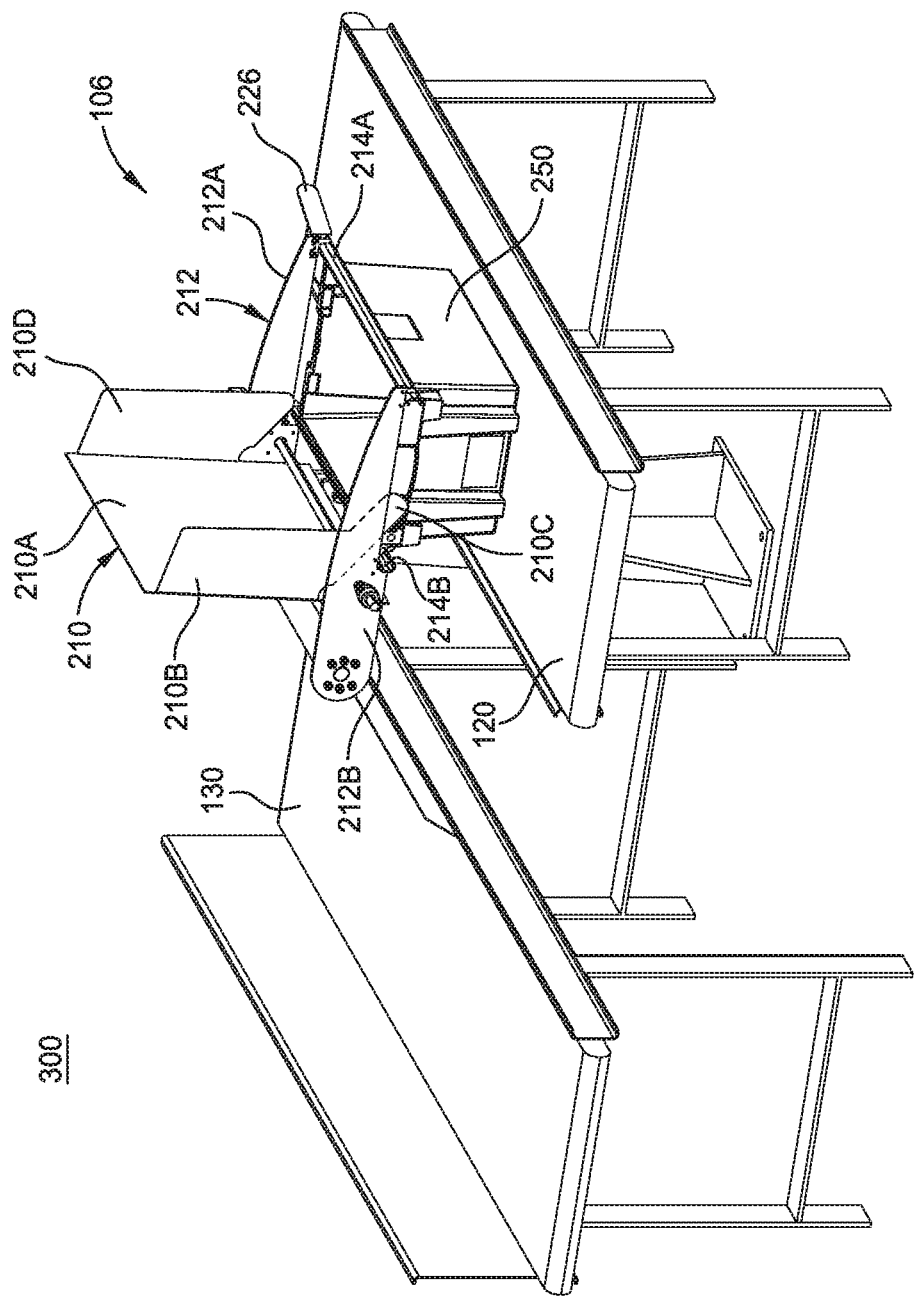
FIG. 3 illustrates an example of a tote flipper tool used with two conveyor belts, according to one embodiment.

In one embodiment, the door assembly 210 is used to stop incoming totes (e.g., on junction segment 120) that come into contact with the arm assembly 212 of the tote flipper tool 106. As shown in FIGS. 2A and 2B, the door assembly 210 includes an elongated (or irregular) portion 210C, which is used as a mechanism to stop totes transitioning on the junction segment 120. For example, as shown in FIG. 3, when the door assembly 210 is rotated to a particular position (e.g., "ready" position), the elongated portion 210C is placed in the transition path of the tote, such that the tote is prevented from moving away from the tote flipper tool 106 on the junction segment 120. Because the side portion 210D may not include an elongated portion, the side portion 210D may not restrict movement of the totes through the arm assembly 212 (e.g., at the particular position).

In one embodiment, the door assembly 210 is used to provide an off ramp for smoothly unloading contents of a tote onto the receiving surface (e.g., junction segment 130). For example, when the door assembly 210 is rotated to a given position(s) (e.g., a predetermined angle, such as 180 degrees or greater) about the second axis B, the door assembly 210 may form an off-ramp for delivering tote contents onto the receiving surface. In particular, at this position, the surface portion 210A may form a bottom surface, and the side portions 210B, 210D may form upwardly extending portions from the bottom surface. FIG. 3 illustrates one reference example of how the surface portion 210A and the side portions 210B and 210D collectively function as an off ramp (e.g., when the door assembly is sufficiently rotated via the door motor 112) for contents of the tote to slide out of the tote. In one embodiment, the side portions 210B and 210D, in this position, may be used as side walls to prevent items from falling from the side of the door assembly 210.

The tote flipper tool 106 further includes guide rails 214A and 214B for guiding a tote (e.g., tote 250) into the tote flipper tool 106. In addition to guiding a tote into the tote flipper tool 106, the guide rails 214A and 214B provide a mechanism for attaching the tote to the (arm assembly of the) tote flipper tool 106 and lifting the tote as the tote is rotated (e.g., flipped above junction segment 130). As shown, the guide rail 214A and the guide rail 214B are mounted to a bottom surface of the first arm member 212A and the second arm member 212B. In particular, the guide rail 214A extends (e.g., along an axis substantially parallel to the first axis A and the second axis B) across the bottom surface of the first and second arm members 212A and 212B at the distal end along the first and second arm members 212A and 212B. Similarly, the guide rail 214B extends (e.g., along an axis substantially parallel to the first axis A and the second axis B) across the bottom surface of the first and second arm members 212A and 212B at a location along the first and second arm members 212A and 212B proximal to the distal end of the first and second arm members 212A and 212B. In one embodiment, the distance between the guide rail 214A and the guide rail 214B (e.g., along the first arm member 212A or second arm member 212B) may be approximately equal to (or depend on) the width of a tote. In one embodiment (e.g., as shown in FIG. 2A), the guide rails 214A and 214B may include flipper guides 270 (that have a slanted configuration relative to the guide rails) to aid in guiding a tote into the guide rails 214A and 214B.

In some embodiments, the tote flipper tool 106 is equipped with one or more sensors (e.g., sensors 108) to aid in the process of unloading a tote. In the particular embodiment shown in FIGS. 2A-2C, the tote flipper tool 106 includes a sensor 232, sensors 230A and 230B, and a sensor 256. The sensor 232 is configured to detect whether the door assembly 210 is in a "closed" position (e.g., the surface portion 210A is secured against the top of the tote) or an "open" position (e.g., the surface portion 210A is not secured against the top of the tote). The sensor 232 is fixed to a bracket 224, which is mounted to the second arm member 212B. The sensors 230A and 230B are configured to detect overtravel positions of the arm assembly 212. For example, the sensor 230A is configured to detect a first (forward) overtravel position (e.g., rotation angle) of the arm assembly 212, e.g., when the arm assembly 212 rotates (or flips) a tote above junction segment 130, and the sensor 230B is configured to detect a second (reverse) overtravel position (e.g., rotation angle) of the arm assembly 212, e.g., when the arm assembly 212 is situated above the junction segment 120. In one embodiment, the sensor 230B may also be configured to detect when the arm assembly 212 is at a predetermined position (e.g., "home" position) for initiating an unloading sequence. The sensor 256 is configured to detect the presence of tote(s) that may be near the tote flipper tool 106 (e.g., in the path of the door assembly 210 and/or arm assembly 212). For example, the sensor 256 can be configured to detect when a tote has come into contact with (or in proximity to) the side portions 210B and/or 210C of the door assembly 210. In this embodiment, the sensor 256 is mounted to guide rail 214B. As described below, the controller 102 may use the feedback from the sensors 232, 230A, 230B, and 256 when performing an unloading sequence. Note that while FIG. 2 depicts the tote flipper tool 106 with four sensors in particular locations, those of ordinary skill in the art should understand that the tote flipper tool 106 can include any number of sensors in location(s) on the tote flipper tool 106 in order to unload contents of a tote.

The tote flipper tool 106 can be used at various heights and can accommodate junction segments with different dimensions. In the embodiment shown in FIG. 2B, for example, the tote flipper tool 106 has an overall width (w)

and overall height ($h_1$). The arm assembly 212 is mounted at a height ($h_2$) relative to the base 202, and the relative height between the bottom of the tote 250 and the base 202 is $h_3$.

FIGS. 4A-4G illustrate an example scenario 400 of the tote flipper tool unloading a tote, according to one embodiment. The controller 102 is configured to independently control the arm motor 110 and the door motor 112, based on sensor feedback and rotary axis feedback, in order to execute a coordinated move sequence to unload the contents of a tote.

Figure 4A:
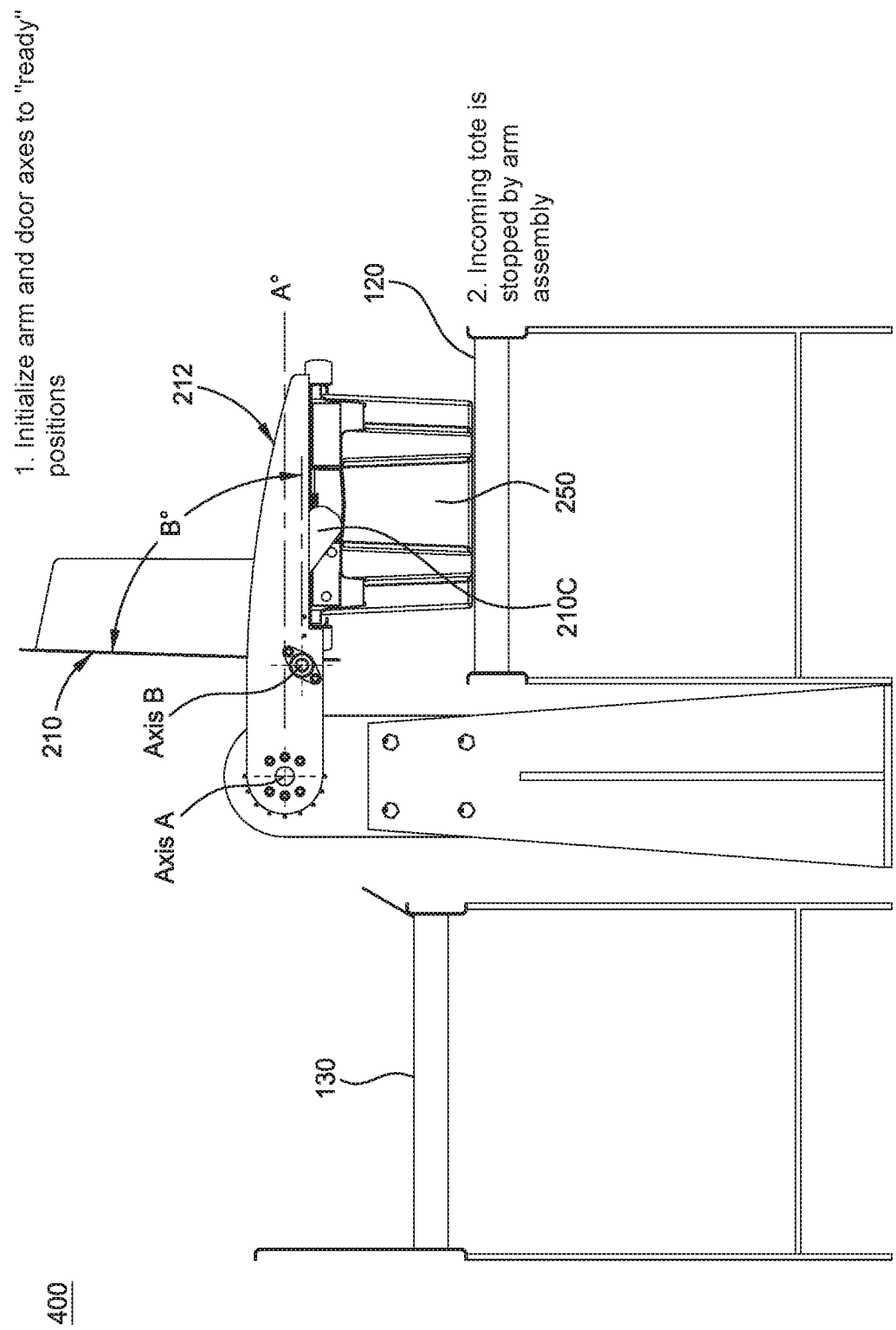
FIGS. 4A-4G illustrate an example scenario of the tote flipper tool unloading a tote, according to one embodiment.

In FIG. 4A, the controller 102 moves the arm motor 110 into a first ("ready") arm position (or location) and the door motor 112 into a first ("ready") door position (or location) in order to await an incoming tote. In this particular example, the relative first arm position for the arm motor 110 is at "A" degrees (e.g., "A"=0) and the relative first door position for the door motor 112 is at "B" degrees. In general, the values of "A" and "B," respectively, may be based in part on the configuration (e.g., size, dimensions, etc.) of the tote, the configuration of the junction segments 120, 130, etc. In one particular embodiment, the value of "B" may be an amount of degrees such that the elongated portion 210C of the door assembly 210 is placed in the path of an incoming tote. As shown, as the tote 250 transitions along the junction segment 120, the tote 250 is guided into the guide rails 214A and 214B of the tote flipper tool 106 and is stopped by the elongated portion 210C of the door assembly 210.

Figure 4B:
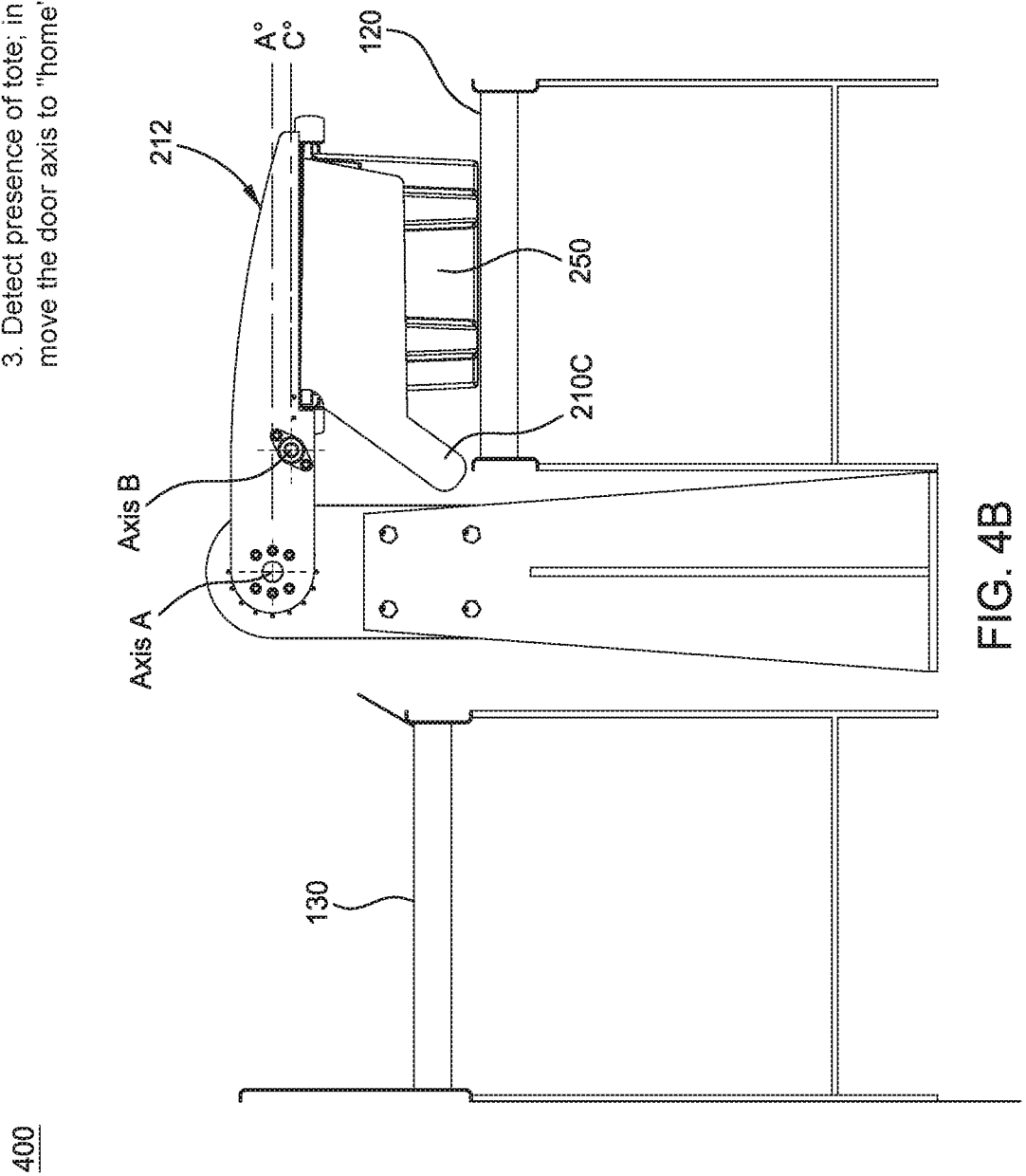
Figure 4C:
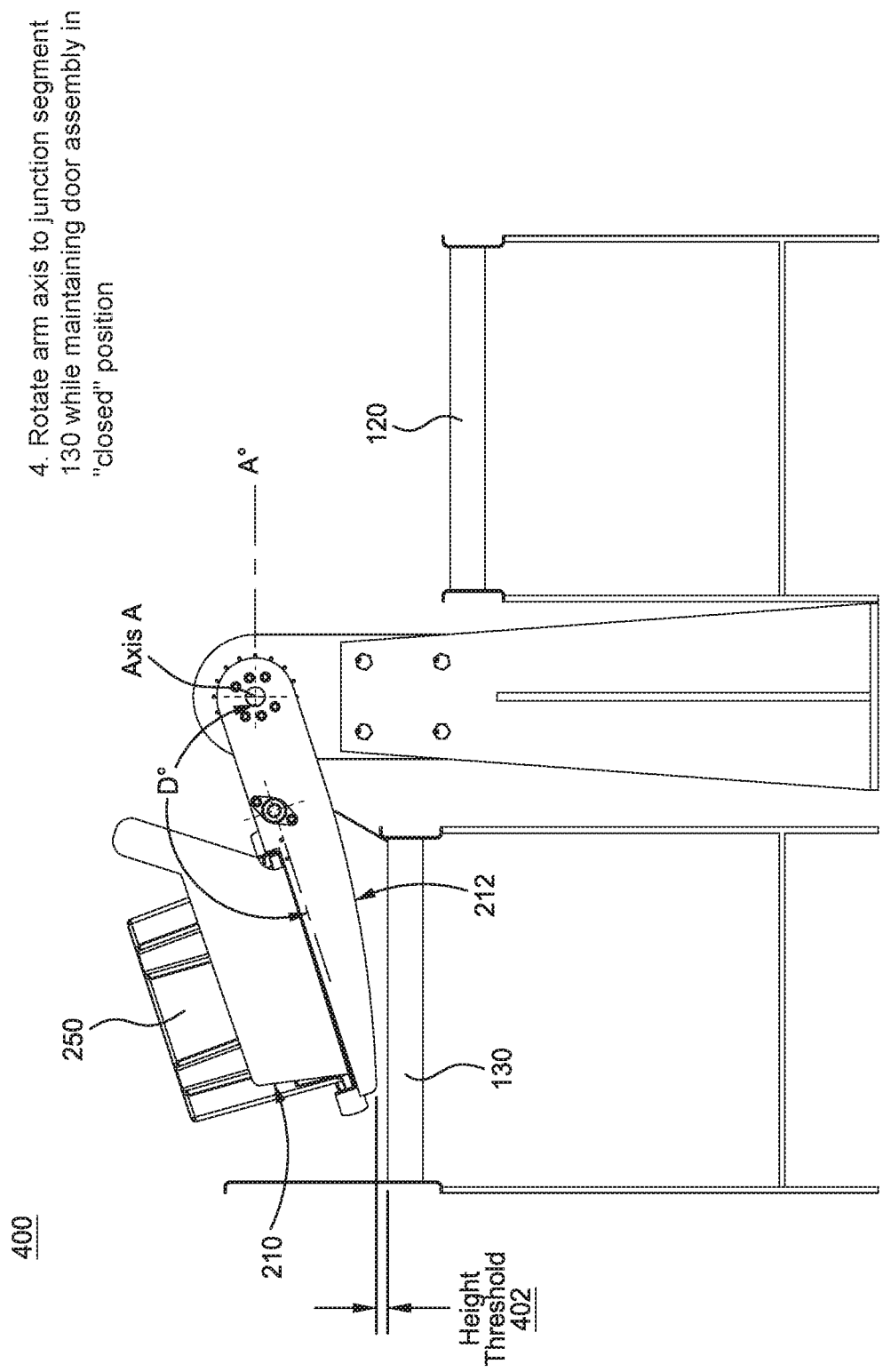

As shown in FIG. 4B, in response to the sensor(s) 256 detecting the presence of the tote 250, the controller 102 moves the door motor 112 to a second door position (e.g., at "C" degrees) in order to close the door and secure the contents of the tote 250. In some embodiments, the controller 102 may stop running the junction segment 120 after moving the door motor 112 to the second door position. Subsequently, as shown in FIG. 4C, the controller 102 moves the arm motor 110 to a second arm position (e.g., at "D" degrees) in order to rotate the tote 250. In one embodiment, the value of "D" for the arm motor 110 may be determined in part on the relative height difference between the junction segment 120 and the junction segment 130 and/or the height threshold 402. For example, the controller 102 may determine the angle "D," such that the distal end of the arm assembly 212 is at a distance approximately equal to the height threshold 402 above the junction segment 130. In one embodiment, while the arm motor 110 is rotated to the second arm position, the door motor 112 is controlled to maintain the door assembly 210 in the "closed" position (e.g., second door position) throughout (e.g., to prevent items from falling out of the tote during the rotation).

Figure 4D:
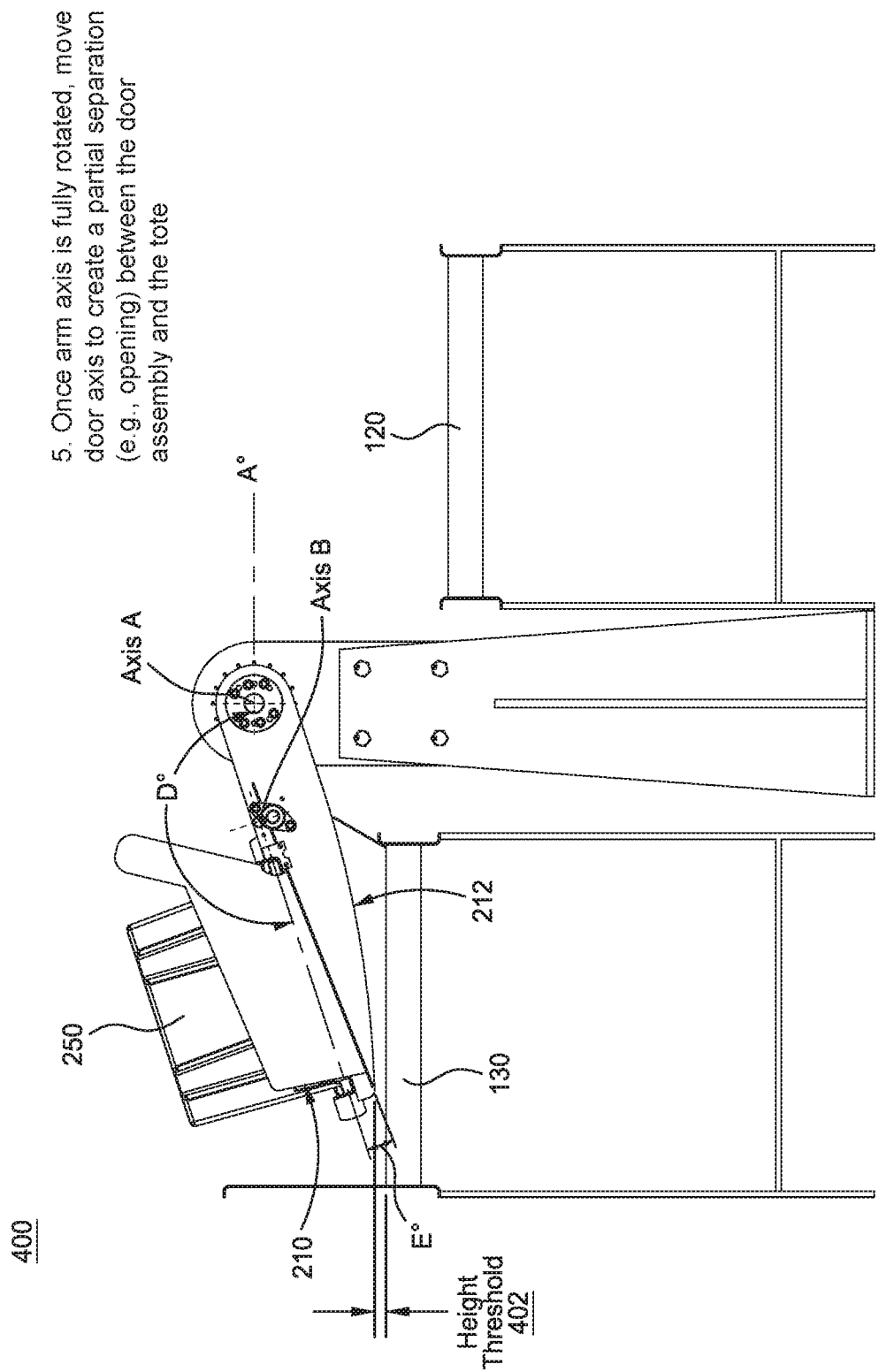

As shown in FIG. 4D, once the arm motor 110 is rotated to the second arm position, the controller 102 moves the door motor 112 to a third door position (e.g., by a relative "E" degrees) in order to create a partial opening between the surface portion 210A of the door assembly 210 and the tote 250. In some embodiments, the controller 102 may create such a partial opening in order to reduce the relative height difference between the surface portion 210A of the door assembly 210 and the surface of the junction segment 130 to the height threshold 402. By reducing the height difference to the height threshold 402, the tote flipper tool 106 can reduce the impact to items falling out of the tote 250. In these embodiments, the value of "E" may depend on the height threshold 402 and the value of "D."

Figure 4E:
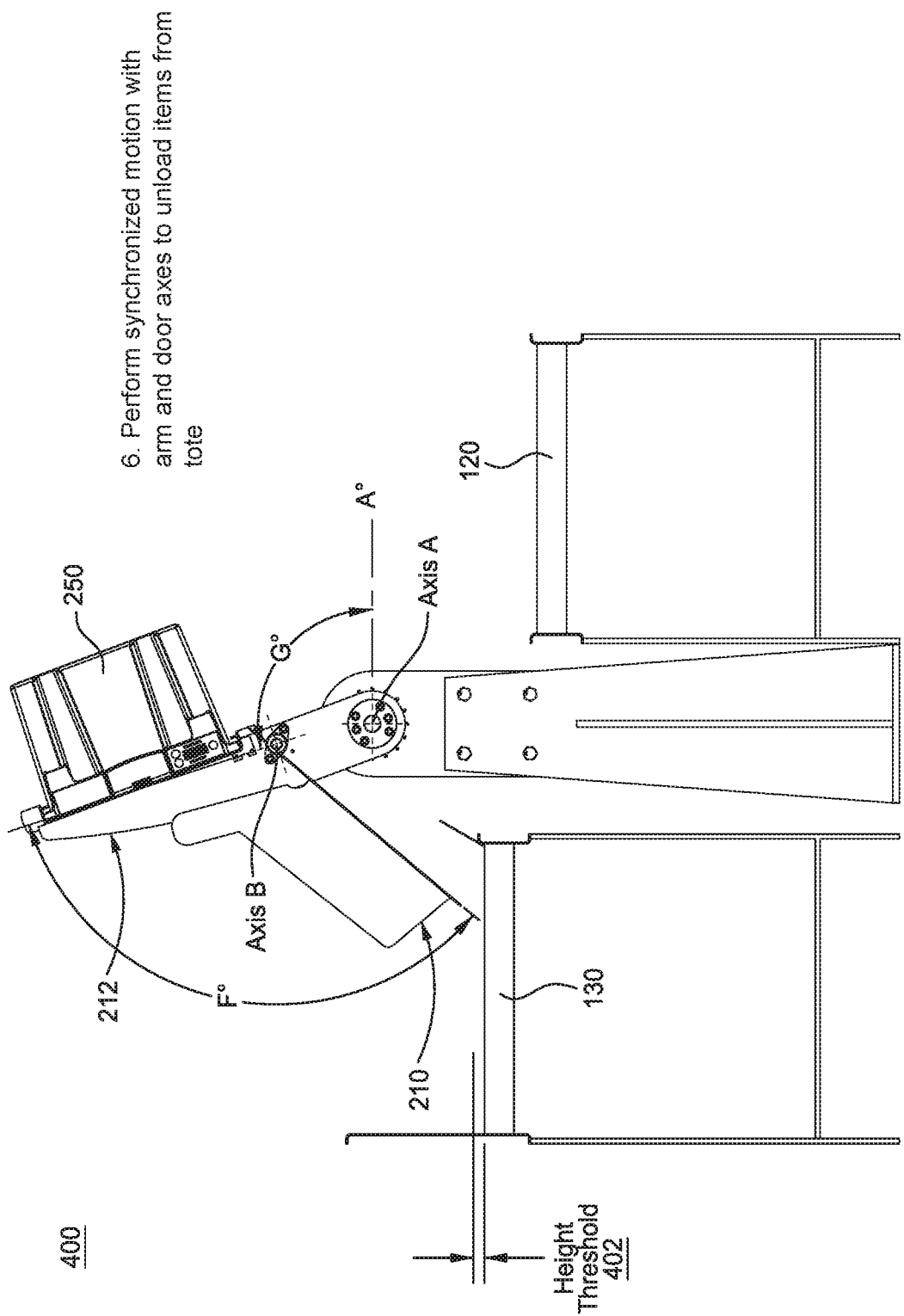

After the door motor 112 is rotated to the third door position, the controller 102, as shown in FIG. 4E, rotates the arm motor 110 to a third arm position (e.g., at "G" degrees) and the door motor 112 to a fourth door position (e.g., at "F" degrees) in a synchronized motion in order to unload the contents of the tote 250 onto the junction segment 130. The values of "F" and "G" may be values that provide a sufficient slope/inclination for the inner surface of the surface portion 210A of the door assembly 210, such that the contents of the tote 250 can offload onto the junction segment 130. In one embodiment, the value of "F" may be at least 71 degrees (or greater). In one embodiment (not shown), the controller 102 may perform another synchronized motion with the arm motor 110 and the door motor 112 to ensure that all of the contents have been unloaded from the tote. For example, the controller 102 can jostle, vibrate, and/or rotate the arm motor 110 and the door motor 112 to another set of positions.

Figure 4F:
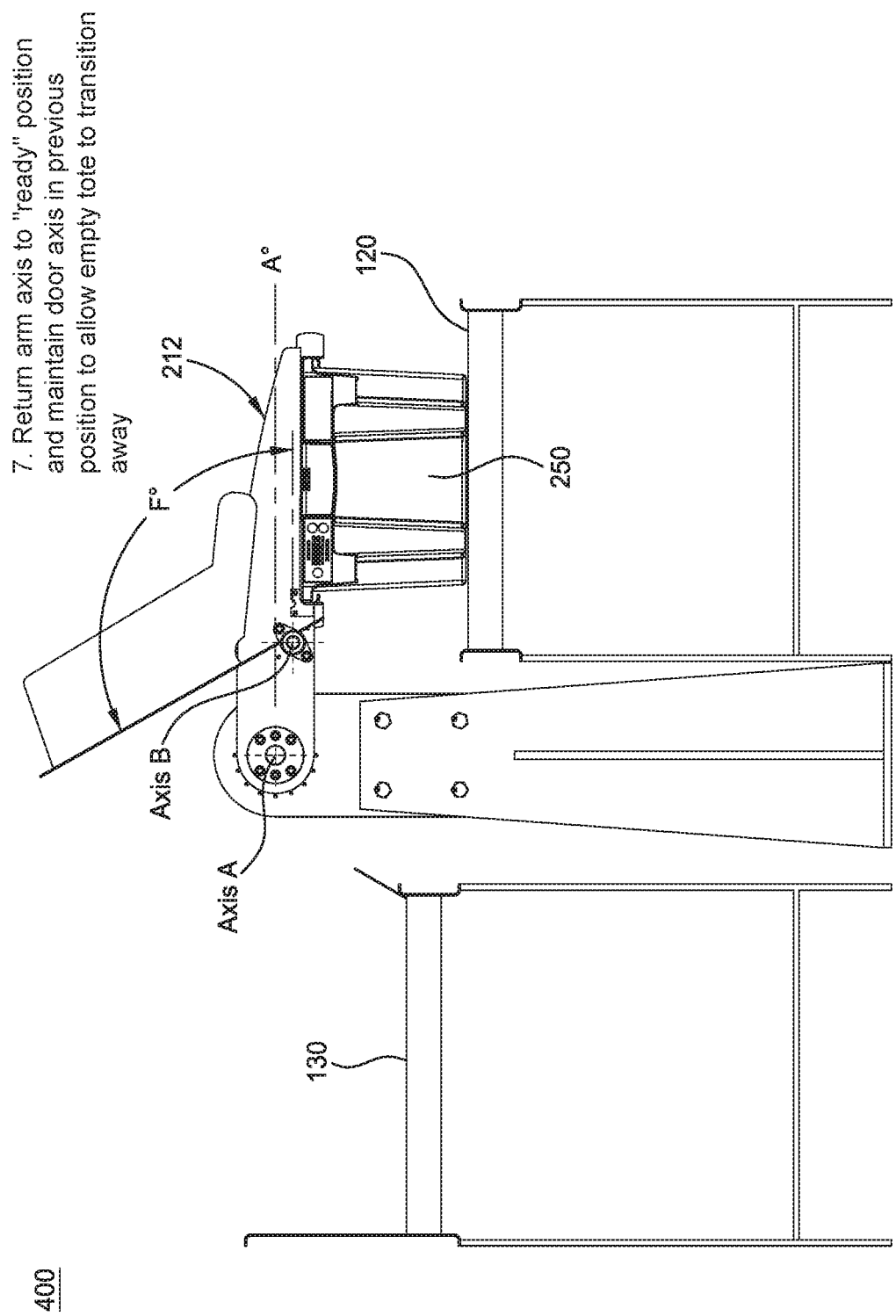
Figure 4G:
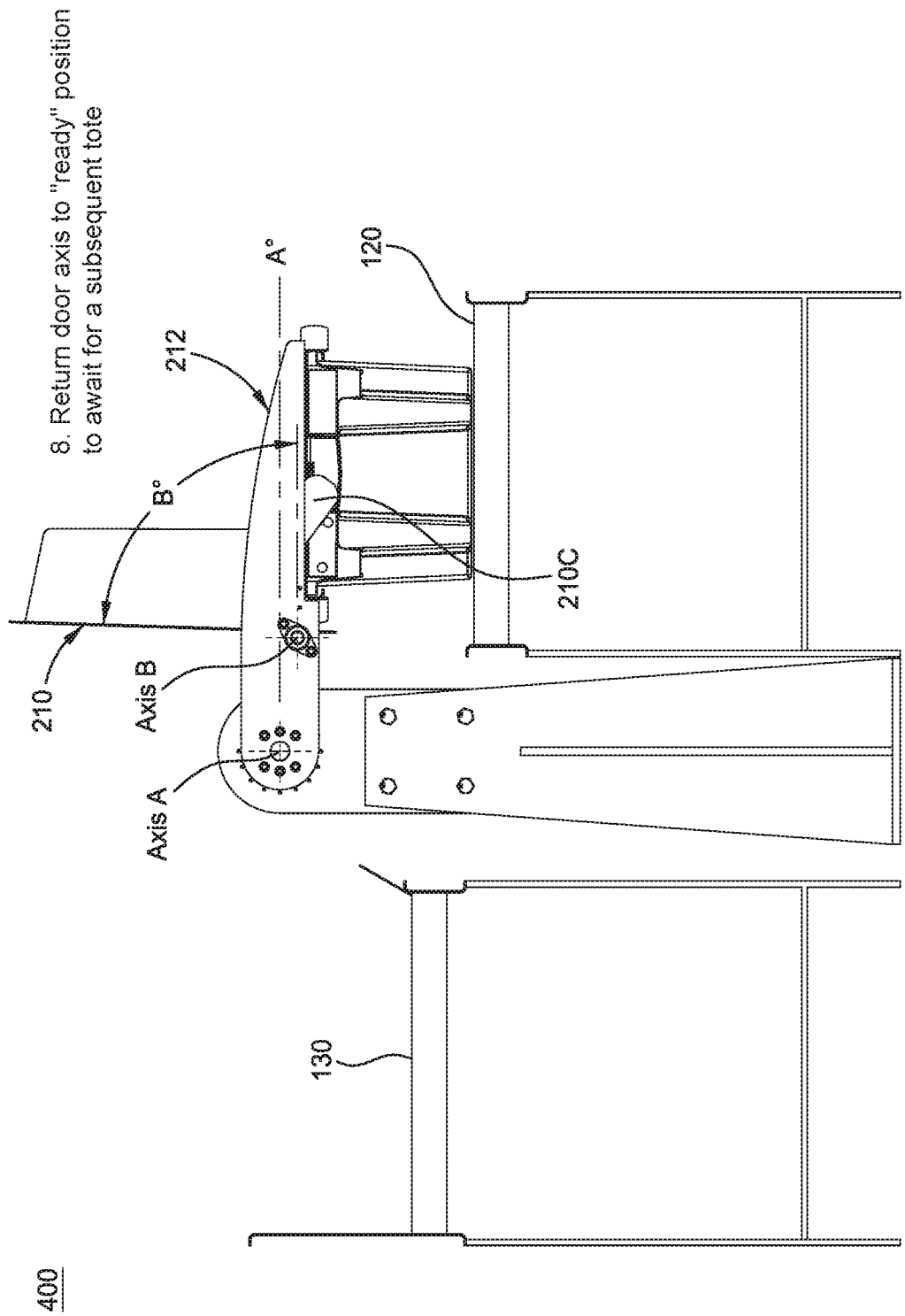

As shown in FIG. 4F, after performing the synchronized motion, the controller 102 moves the arm motor 110 to the first arm position (e.g., at "A" degrees), e.g., in order to return the tote 250 to the junction segment 120. At this point, the controller 102 may run the junction segment 120 in order to transition the emptied tote 250 away from the tote flipper tool 106. Here, because the door motor 112 is still rotated to the fourth door position (e.g., at "F" degrees), the elongated portion 210C of the door assembly 210 does not block movement of the tote 250 away from the tote flipper tool 106. As shown in FIG. 4G, after the tote 250 is transitioned away from the tote flipper tool 106, the controller 102 moves the door motor 112 back to the first door ("ready") position (e.g., at "B" degrees) so that the tote flipper tool 106 can await for a subsequent tote.

FIG. 5 illustrates a perspective view of an example system 500 for unloading items from a tote, according to one embodiment. The system 500 includes a tote flipper tool (or machine) 506, an in feed conveyor section 520 that transitions loaded totes 550 to an area 522 adjacent to the tote flipper tool 506 and transitions empty totes 550 away from the tote flipper tool 506, and an out feed conveyor section 530 that transitions unloaded items from totes for subsequent processing (e.g., downstream processing).

The out feed conveyor section 530 includes conveyor modules 532A, 532B, 532C, and 532D in a linear configuration, where each downstream conveyor module is at a waterfall height relative to an adjacent upstream conveyor module. For example, as shown, the belt of conveyor module 532B is at a lower height relative to the belt of conveyor module 532A, the belt of conveyor module 532C is at a lower height relative to the belt of conveyor module 532B, and the belt of conveyor module 532D is at a lower height relative to the belt of conveyor module 532C. In some embodiments, each conveyor module 532 includes side guards 540 to prevent the unloaded items from falling off of the out feed conveyor section 530.

Each conveyor module 532 includes two separate motors (e.g., DC motors) for driving two separate belts of the conveyor module. As shown in FIG. 5A1, for example, the conveyor module 532C (in addition to conveyor modules 532 A-B and D) includes a first (outside) belt 534 and a second (inner) belt 536. In this embodiment, the first belt 534 is driven at a higher speed relative to the second belt 536. For example, during an unloading sequence, the tote flipper tool 506 may initially drop items onto the first belt 534 and subsequently drop items onto the second belt 536. In this example, the items that drop onto the first belt 534 would begin to pull apart from items that drop onto the second belt 536, e.g., to the relative speed difference of the two separate belts. Thus, by driving the separate belts 534 and 536 of each conveyor module 532 A-D at different speeds, the system 500 can begin to pull items apart (e.g., singulate) as the items are unloaded onto the conveyor module 532A by the tote flipper tool 506. In other embodiments, the second belt 536 may be driven at a higher speed relative to the first belt 534.

Figure 6:
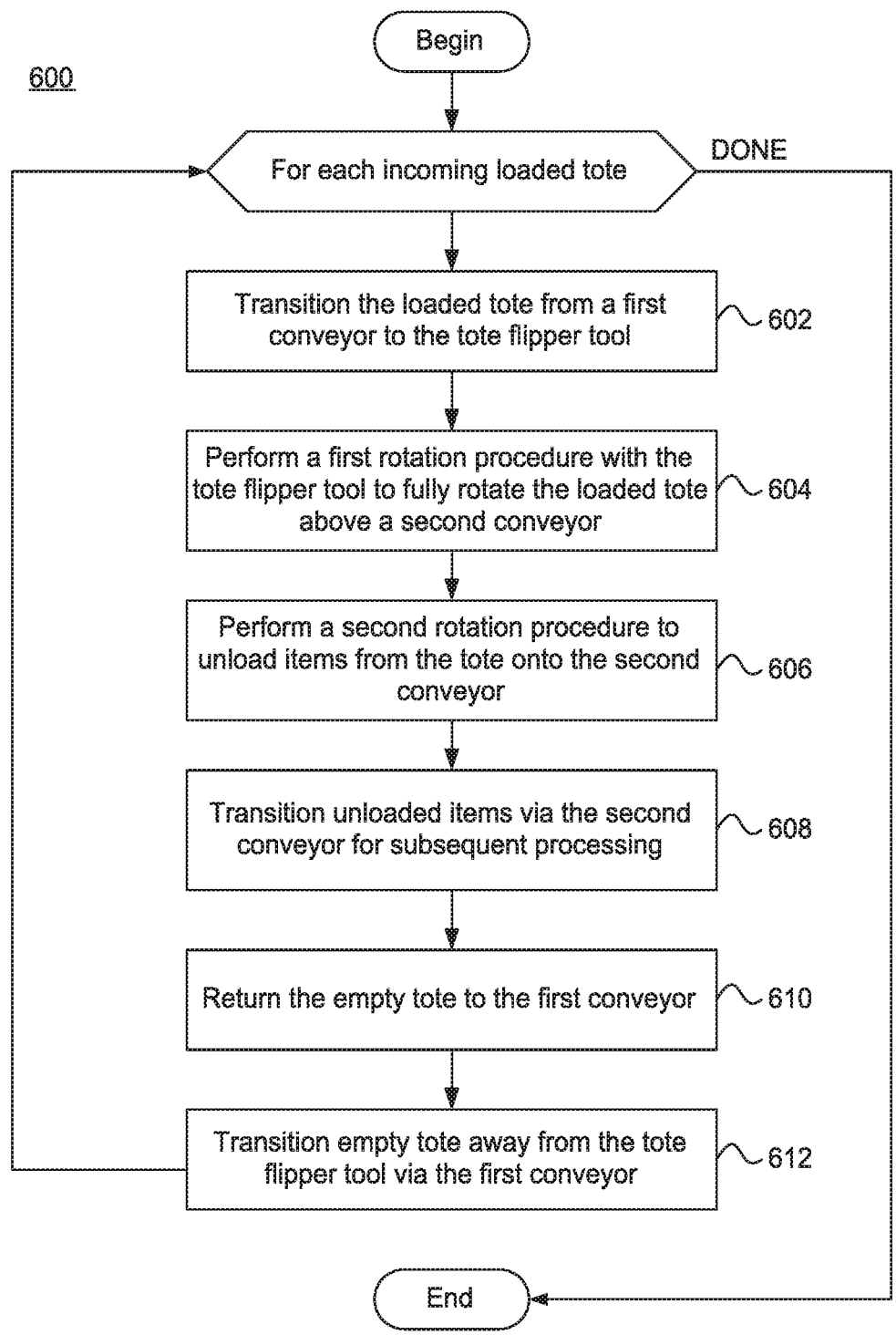
FIG. 6 is a flowchart illustrating a method for controlling a tote singulation system, according to one embodiment.

FIG. 6 is a flowchart illustrating a method 600 for controlling a tote singulation system, according to one embodiment. The method 600 may be performed by the controller 102 for each incoming tote.

The method 600 begins at block 602, where the controller 102 transitions the loaded tote from a first conveyor (e.g., junction segment 120) to the tote flipper tool (e.g., tote flipper tool 106, tote flipper tool 506, etc.). In some embodiments, the controller 102 may stop running the first conveyor upon engaging the loaded tote with the tote flipper tool. At block 604, the controller 102 performs a first rotation procedure with the tote flipper tool to fully rotate (or flip) the loaded tote above a second conveyor (e.g., junction segment 130, conveyor module 532A, etc.). In some embodiments, the controller 102 may rotate the loaded tote to a position (e.g., a predetermined amount of degrees) such that a relative height difference between the distal end of the arm assembly 212 and the second conveyor is approximately equal to (or within range of) a height threshold (e.g., height threshold 402). At block 606, the controller 102 performs a second rotation procedure (e.g., synchronized rotation procedure) to unload items from the tote onto the second conveyor. At block 608, the controller 102 transitions unloaded items via the second conveyor for subsequent processing (e.g., singulation, packaging, etc.). At block 610, the controller 102 returns the empty tote to the first conveyor with the tote flipper tool. At block 612, the controller 102 transitions the empty tote away from the tote flipper tool via the first conveyor.

Figure 7:
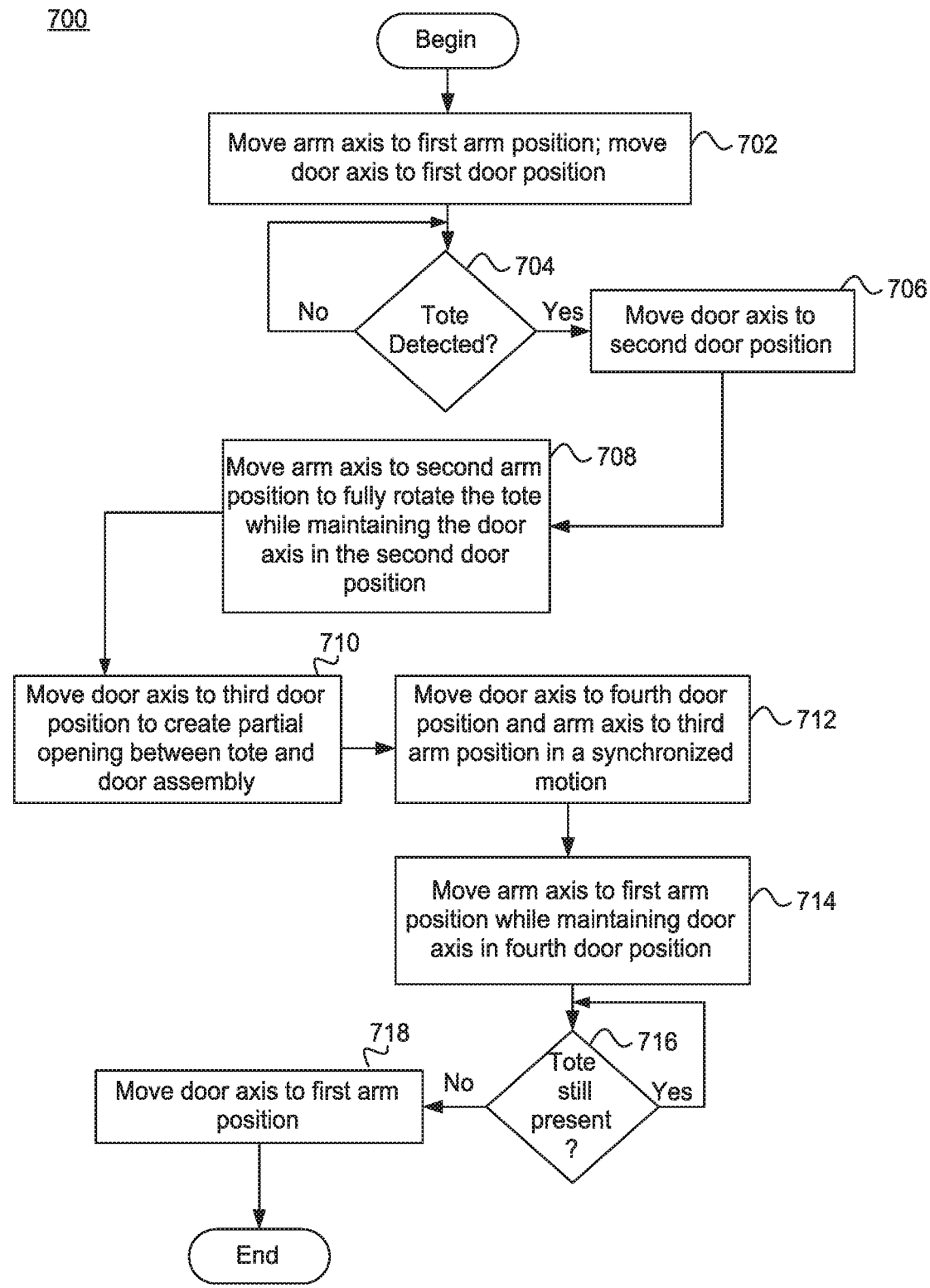
FIG. 7 is a flowchart illustrating a method for unloading items from a tote, according to one embodiment.

FIG. 7 is a flowchart illustrating a method 700 for unloading items from a tote, according to one embodiment. The method 700 may be performed by the controller 102 (e.g., using the tote flipper tool 106).

The method 700 begins at block 702, where the controller 102 moves (or rotates) the arm axis (e.g., arm motor 110 of the tote flipper tool 106) to a first arm position (e.g., "A" degrees about the first axis A) and moves (or rotates) the door axis (e.g., door motor 112 of the tote flipper tool 106) to a first door position (e.g., "B" degrees about the second axis B). In some embodiments, the first arm position and the first door position represent "ready" positions where the tote flipper tool is configured to await for an incoming tote (e.g., from junction segment 120).

At block 704, the controller 102 determines if a tote has been detected (e.g., by one or more sensors 108 of the tote flipper tool). If not, the method remains at block 704. If a tote is detected (e.g., value of "tote present" from sensor(s) 256 is "true"), the controller 102 moves the door axis to a second door position (e.g., "C" degrees about the second axis B) (block 706). In one embodiment, the second door position is a "closed" position (e.g., "C"=0) for the door assembly 210 in which the surface portion 210A of the door assembly 210 is secured (or forms an enclosure) against the top opening of the tote. The controller 102 may determine whether the door axis is at the second door position based on feedback from sensor 232 (e.g., indicating whether the door assembly 210 is in the "closed" position) and/or feedback from the door axis. In one embodiment, the second door position and the first arm position collectively represent a "home" position where the tote flipper tool is ready to initiate a rotation (or unloading) sequence. In one embodiment, the controller 102 may stop running the in feed conveyor (e.g., junction segment 120) in response to detecting and/or engaging the incoming tote with the tote flipper tool.

At block 708, the controller 102 moves the arm axis to a second arm position (e.g., "D" degrees about the first axis A) in order to fully rotate the tote, while maintaining the door axis in the second door position (e.g., to prevent the contents of the tote from falling out while the tote is being rotated). In one embodiment, the second arm position may be greater than or equal to 180 degrees. In one particular embodiment, the second arm position is at 197.5 degrees. After moving the arm axis to the second arm position, the controller 102 moves the door axis to a third door position (e.g., "E" degrees about the second axis B) to create a partial opening between the tote and the surface portion 210A of the door assembly 210 (block 710).

After moving the door axis to the third door position, the controller 102 moves the door axis to a fourth door position (e.g., "F" degrees about the second axis B) and the arm axis to a third arm position (e.g., "G" degrees about the first axis A) in a synchronized motion (block 712). In some embodiments, after performing this synchronized motion, the controller 102 may perform one or more additional synchronized motions with the arm axis and the door axis to remove items that may be stuck in the tote. In some embodiments, the controller 102 may use one or more (e.g., IR) sensors situated above the top of the tote to determine the presence of items within the tote.

At block 714, the controller 102 moves the arm axis to the first arm position while maintaining the door axis in the fourth door position (e.g. to return the empty tote back to the junction segment 120). At this point, the controller 102 may resume running the junction segment 120, e.g., to transition the empty tote away from the tote flipper tool 106. At block 716, the controller 102 determines if the tote is still present. If so, the method remains at block 716. If the tote is no longer present (e.g., value of "tote present" from sensor(s) 256 is "false"), the controller 102 moves the door axis to the first arm position (e.g., to await the next incoming loaded tote). The method then ends.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A tote flipping apparatus comprising:
    an arm assembly comprising a first arm, a second arm parallel to the first arm, and first and second shafts each disposed between the first and second arms;
    a door assembly disposed between the first arm and the second arm, the door assembly comprising:
        a surface portion mounted to the second shaft;
        a first side portion at a first side of the surface portion adjacent to the first arm; and
        a second side portion at a second side of the surface portion adjacent to the second arm;
    a first rotary motor attached to the first shaft and configured to rotate the arm assembly about a first axis extending along a length of the first shaft; and
    a second rotary motor attached to the second shaft and configured to rotate the door assembly about a second axis extending along a length of the second shaft.

2. The tote flipping apparatus of claim 1, further comprising first and second guide rails configured to align and attach a tote to the door assembly.

3. The tote flipping apparatus of claim 2, wherein the first guide rail and the second guide rail are attached to a bottom surface of the first arm and a bottom surface of the second arm.

4. The tote flipping apparatus of claim 2, wherein the first guide rail and the second guide rail are parallel to each other.

5. The tote flipping apparatus of claim 2, further comprising:
    a first guide attached to an end of the first guide rail; and
    a second guide attached to an end of the second guide rail, the first and second guides being configured to guide the tote into the first and second guide rails.

6. The tote flipping apparatus of claim 2, wherein a distance between the first arm and the second arm is based on a first dimension of the tote.

7. The tote flipping apparatus of claim 6, wherein a distance between the first and second guide rails is based on a second dimension of the tote.

8. The tote flipping apparatus of claim 7, wherein:
    the first dimension is length; and
    the second dimension is width.

9. The tote flipping apparatus of claim 1, wherein the first and second side portions of the door assembly are upwardly extending relative to the surface portion when the door assembly is rotated to a predetermined position about the second axis, such that the door assembly forms a chute for unloading items from an opening of a tote at the predetermined position.

10. The tote flipping apparatus of claim 1, wherein the first and second side portions of the door assembly are downwardly extending relative to the surface portion when the door assembly is rotated to a predetermined positon about the second axis, such that the door assembly forms an enclosure over an opening of a tote at the predetermined position.

11. The tote flipping apparatus of claim 1, wherein the first side portion of the door assembly has a different shape than the second side portion of the door assembly.

12. The tote flipping apparatus of claim 11, wherein:
    the first side portion of the door assembly is configured in a first shape such that the first side portion of the door assembly does not restrict movement of a tote when the door assembly is rotated to a predetermined position; and
    the second side portion of the door assembly is configured in a second shape such that the second side portion of the door assembly restricts movement of the tote when the door assembly is rotated to the predetermined position.

13. The tote flipping apparatus of claim 1, wherein the first rotary motor and the second rotary motor are configured to perform a synchronous rotation of the arm assembly and the door assembly, respectively.

14. The tote flipping apparatus of claim 1, wherein the arm assembly and the door assembly are independently rotatable about the first axis and the second axis, respectively.

15. The tote flipping apparatus of claim 1, further comprising a position sensor mounted to the arm assembly and configured to detect a position of the door assembly about the second axis.

16. The tote flipping apparatus of claim 1, further comprising:
    a first sensor configured to detect a first position of the arm assembly about the first axis; and
    a second sensor configured to detect a second position of the arm assembly about the first axis, wherein the second position is at least 180 degrees greater than the first position.

17. The tote flipping apparatus of claim 1, further comprising one or more presence sensors configured to detect a presence of a tote in proximity to the tote flipping apparatus.

18. The tote flipping apparatus of claim 1, wherein the first axis is parallel to the second axis.

19. The tote flipping apparatus of claim 1, wherein the first rotary motor is offset vertically relative to the second rotary motor.

20. The tote flipping apparatus of claim 1, wherein:
    the first rotary motor is attached to the first shaft via the first arm; and
    the second rotary motor is attached to the second shaft via the first arm.

* * * * *

UNITED STATES PATENT AND TRADEMARK OFFICE
CERTIFICATE OF CORRECTION

| | |
|---|---|
| PATENT NO. | : 11,104,527 B1 |
| APPLICATION NO. | : 16/266519 |
| DATED | : August 31, 2021 |
| INVENTOR(S) | : Longyu Zhao et al. |

It is certified that error appears in the above-identified patent and that said Letters Patent is hereby corrected as shown below:

In the Claims

In Column 14, Line 2, in Claim 10, delete "positon" and insert -- position --.

Signed and Sealed this
Twenty-eighth Day of February, 2023

Katherine Kelly Vidal
*Director of the United States Patent and Trademark Office*